(12) United States Patent
Tsai (10) Patent No.: US 7,965,667 B2
(45) Date of Patent: Jun. 21, 2011

(54) POWER MANAGEMENT IN WIRELESS NETWORK

(75) Inventor: J R Shian Tsai, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 730 days.

(21) Appl. No.: 12/105,197

(22) Filed: Apr. 17, 2008

(65) Prior Publication Data

US 2009/0262675 A1 Oct. 22, 2009

(51) Int. Cl.
*G06F 1/26* (2006.01)
*G06F 11/34* (2006.01)

(52) U.S. Cl. ............. 370/311; 370/395.4; 713/300; 713/320

(58) Field of Classification Search .......... 370/310–328; 713/300–330; 714/45, E11.202; 710/301; 342/357.52, 357.57, 357.74; 455/574
See application file for complete search history.

(56) References Cited

U.S. PATENT DOCUMENTS

| | | | |
|---|---|---|---|
| 7,564,810 B2 * | 7/2009 | Hernandez et al. | 370/311 |
| 7,685,606 B2 * | 3/2010 | Chang | 719/318 |

OTHER PUBLICATIONS

LAN/MAN Standards Committee of the IEEE Computer Society, "Information technology-Telecommunications and information exchange between systems-Local and metropolitan area networks—Specific requirements—Part 11: Wireless LAN Medium Access Control (MAC) and Physical Layer (PHY) Specifications", ANSI/IEEE Std. 802.11, 1999 Edition (R2003), pp. 17-172, IEEE, New York, New York.

LAN/MAN Standards Committee of the IEEE Computer Society and the IEEE Microwave Theory and Techniques Society, "IEEE Standard for Local and metropolitan area networks, Part 16: Air Interface for Fixed and Mobile Broadband Wireless Access Systems and Amendment 2: Physical and Medium Access Control Layers for combined Fixed and Mobile Operation in Licensed Bands and Corrigendum 1", IEEE Std. 802.16e-2005 and IEEE Std. 16/2004/Cor1-2005, pp. 98-137, IEEE, New York, New York.

* cited by examiner

*Primary Examiner* — Afsar M. Qureshi (74) *Attorney, Agent, or Firm* — Schwabe, Williamson & Wyatt, P.C.

(57) ABSTRACT

Embodiments of apparatuses, articles, methods, and systems for power management in wireless networks are generally described herein. Other embodiments may be described and claimed.

20 Claims, 6 Drawing Sheets

POWER MANAGEMENT IN WIRELESS NETWORK

FIELD

Embodiments of the present invention relate generally to the field of wireless networks, and more particularly to power management of communication devices used in said wireless networks.

BACKGROUND

Many wireless communication protocols have power saving modes that allow a network interface card (NIC) of a mobile station to be inactivated when the mobile station is idle and reactivated when the mobile station is engaged in active communications. However, in many instances the costs associated with the latency of communicating activation/deactivation of the NIC to a base station outweighs the benefits provided by powering down the NIC. This is especially true in the case of a wireless communication protocol that strictly choreographs the allocation of uplink and downlink access periods of the various communication devices of the network.

BRIEF DESCRIPTION OF THE DRAWINGS

Embodiments are illustrated by way of example and not by way of limitation in the figures of the accompanying drawings, in which like references indicate similar elements.

DETAILED DESCRIPTION

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific devices and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the present invention; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise.

In providing some clarifying context to language that may be used in connection with various embodiments, the phrases "A/B" and "A and/or B" mean (A), (B), or (A and B); and the phrase "A, B, and/or C" means (A), (B), (C), (A and B), (A and C), (B and C) or (A, B and C).

As used herein, reference to a "component" may refer to a hardware, a software, and/or a firmware component employed to obtain a desired outcome. Although only a given number of discrete components may be illustrated and/or described, such components may nonetheless be represented by additional components or fewer components without departing from the spirit and scope of embodiments of this disclosure.

Figure 1:
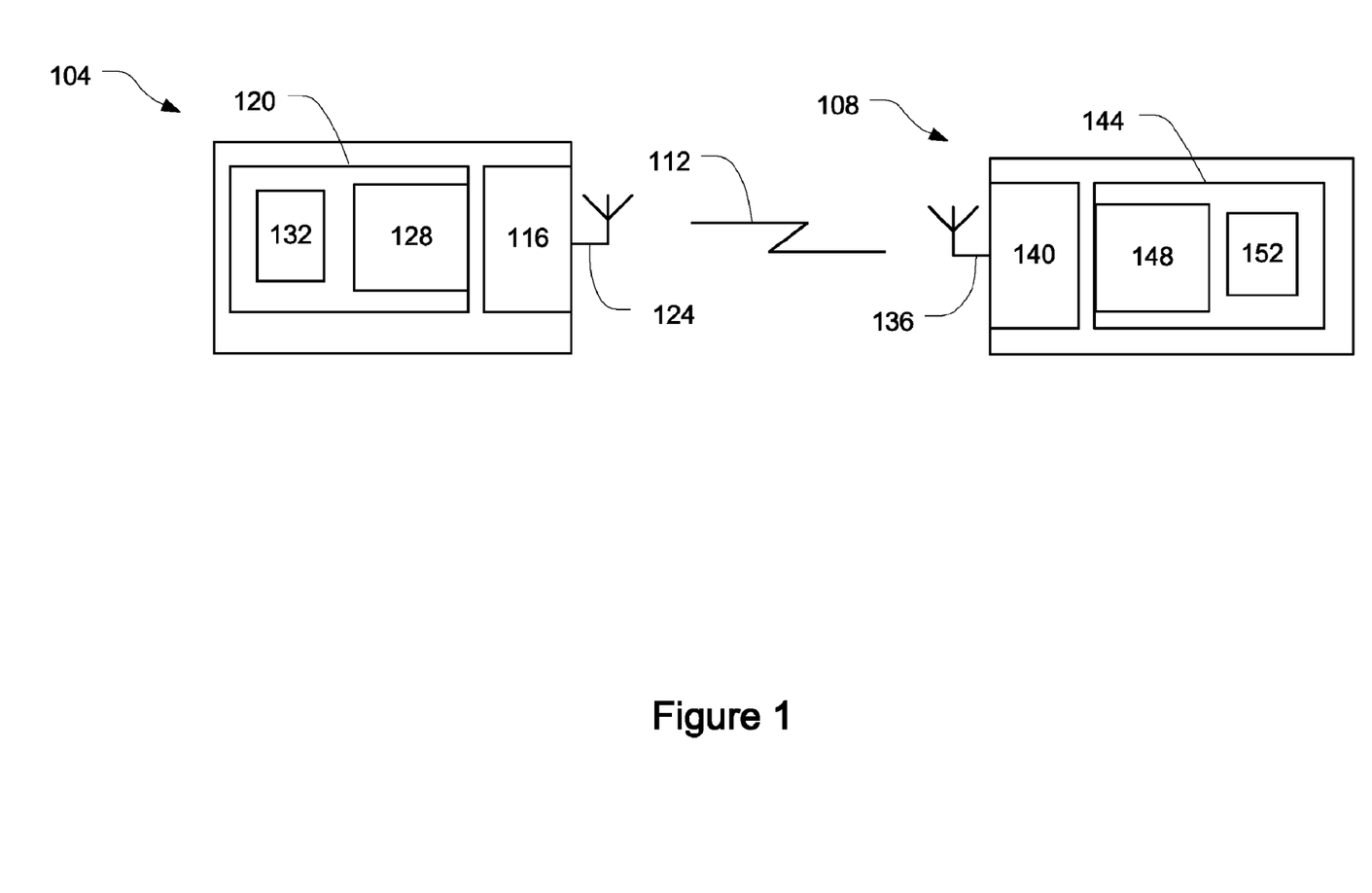
FIG. 1 illustrates a network of wireless network nodes which support power management policies as will be described with reference to various embodiments.

FIG. 1 illustrates a network 100 of wireless network nodes which support power management policies as will be described with reference to various embodiments. In particular, the network 100 may include a mobile subscriber station (MSS) 104 and a base station 108. The MSS 104 may be in direct wireless communication with the base station 108 via an over-the-air (OTA) link 112.

Communication among the nodes of the network 100 may take place in accordance with one or more of the Institute of Electrical and Electronics Engineers (IEEE) wireless standards, e.g., 802.16-2004/Cor 1-2005 (approved Nov. 8, 2005) as amended by 802.16e-2005 (approved Dec. 7, 2005) along with any revisions, amendments or updates thereto.

The MSS 104 may include a wireless network interface, e.g., wireless network interface card (WNIC) 116 to communicatively couple the MSS 104 to other devices of the network 100, e.g., the base station 108. The WNIC 116 may facilitate processing of messages to and/or from components of a host 120. The WNIC 116 may utilize an antenna structure 124 for transmission/reception of radio frequency signals via the OTA link 112.

In various embodiments, the antenna structure 124 may include one or more omnidirectional antennas, which radiate or receive equally well in all directions.

In various embodiments, the host 120 may include a driver 128 to drive the WNIC 116 for other components of the host 120 such as a power management component, e.g., power manager 132. The power manager 132 may control power management operations of the MSS 104 as will be discussed.

The base station 108 may include an antenna structure 136, a WNIC 140, a host 144 and a driver 148, similar to like-name components of the MSS 104. The antenna structure 136, however, may include one or more directional antennas, which radiate or receive primarily in one direction (e.g., for 120 degrees), cooperatively coupled to one another to provide substantially omnidirectional coverage. In other embodiments, the antenna structure 136 may include one or more omnidirectional antennas, similar to the antenna structure 124.

The host 144 of the base station 108 may include a scheduling component, e.g., scheduler 152. The scheduler 152 may coordinate transmissions in the network 100 by allocating uplink (UL) access slots to specific subscriber stations of the network 100. Depending on the nature of the data being communicated, these UL access slots may be allocated on a periodic basis or as a result of a specific bandwidth request by a subscriber station. The scheduler 152 may also allocate contention-based, rather than subscriber-station designated, UL access slots for initial ranging and/or bandwidth requests. The base station 108 may communicate the allocation of the UL access slots to the subscriber stations by transmitting a UL-map in a downlink (DL) subframe.

The MSS 104 and the base station 108 may be any type of communication device capable of performing respective operations described herein. In some embodiments these devices may include mobile network client devices such as, but not limited to, a personal computing device, a laptop computing device, a phone, etc., or network infrastructure devices, e.g., a server, an access point, etc.

Figure 2:
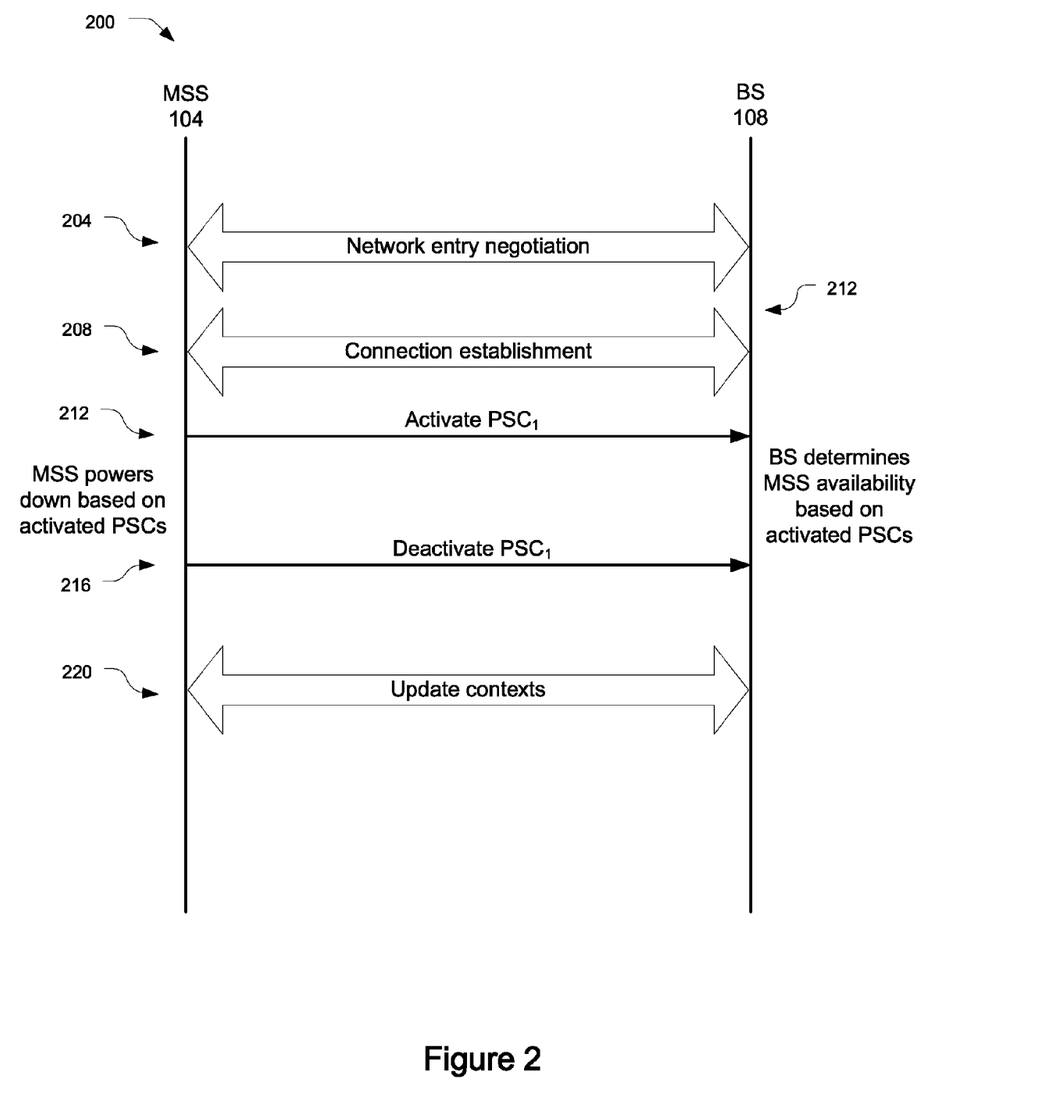
FIG. 2 illustrates message sequences between a mobile subscriber station and a base station in accordance with various embodiments.

FIG. 2 illustrates message sequences 200 between the MSS 104 and the base station 108 in accordance with various embodiments. The MSS 104 and the base station 108 may engage in a network entry negotiation 204. This network entry negotiation 204 may include registration and authentication of the MSS 104, derivation of security measures, discovery of capabilities/settings of the various nodes, etc.

In some embodiments, prior to, or contemporaneously with, the network entry negotiation 204 the base station 108 may advertise a power management capability through an information element (IE) sent to the MSS 104. This may be sent in either a broadcast or a unicast message.

During the network entry negotiation 204 the MSS 104 may provide the base station 108 with contexts for one or more power saving classes. A power saving class may describe a sleep schedule (e.g., an alternating sequence of sleep periods and listening periods) that is employed when the power saving class is activated. A context of a particular power saving class may include which connections are associated with the power saving class as well as various attributes of the power saving class. The attributes may include, but are not limited to, activation/deactivation procedures, parameters of the sleep schedule (e.g., intervals between sleep windows, size of sleep windows, etc.), etc.

After, or contemporaneously with, network entry negotiation 204 the MSS 104 may establish one or more connections with the base station 108 at 208. The connections may be services flows characterized by a particular quality of service (QoS) designation based on the type of traffic being communicated. These QoS service flows may include, but are not limited to, best efforts (BE) service, real time variable rate (RT-VR) service, non-real time variable rate (NRT-VR) service, and unsolicited grant service (UGS).

The connection establishment 208 may also include updating the contexts of the power saving classes to associate each of the connections with one of the power saving classes. A connection may be associated with a power saving class that provides a desired/compatible sleep schedule.

With the appropriate connections established and the contexts of the power saving classes defined as desired, the MSS 104 may perform a fast signaling operation to activate/deactivate a selected power saving class. A fast signaling operation, as used herein, may refer to transmission of a power management message (e.g., a message including power management information) within an uplink access slot not specifically allocated for a power management message. Power management information, as used herein, may include one or more power saving bits, to communicate whether an activation or a deactivation of a particular power saving class is desired, and a connection identifier (ID) that corresponds to a connection which is associated with the power saving class for which activation/deactivation is desired. In some embodiments, the power management information communicated in the power management message may consist solely of the power saving bits and the connection ID. This may facilitate incorporation of the power management information into a variety of different types of messages.

The MSS 104 may perform a fast signaling operation to activate a first power saving class, e.g., $PSC_1$, by sending power management message 212 including power saving bits and a connection ID. The scheduler 152 of the base station 108 may receive the power management message 212, determine that it is an activation command through its power saving bits, determine that it pertains to $PSC_1$ by referencing the stored contexts to find an association between $PSC_1$ and the connection that corresponds to the connection ID, and activate the $PSC_1$. To deactivate $PSC_1$ at a later time, the MSS 104 may send power management message 216 including appropriate power saving bits and connection ID. The connection ID in the power management message 216 may be the same one that was sent in power management message 212 or another one that is associated with $PSC_1$.

The MSS 104 may update contexts 220 of one or more of the power saving classes at any time by transmitting management messages, e.g., dynamic service addition messages.

In some embodiments, the power saving bits may be piggybacked into a MAC frame header that is being sent for a connection associated with the appropriate power saving class, primarily for another reason (e.g., to request bandwidth for the connection for a data transmission not related to power management). Alternatively, the power management information may be communicated in a MAC frame header that is transmitted solely for communicating the power management information in a contention-based access slot (e.g., a ranging request). Either way, communication of the power management information may be accomplished without the need for a specific request and allocation of a UL access slot for uploading a power management message (along with their associated latencies).

Availability of the MSS 104 to receive DL transmissions may be determined by referencing an aggregation of the active power saving classes. For example, the MSS 104 may be available whenever at least one listening window of an active power saving class is present. However, the MSS 104 may be unavailable during periods in which the sleep windows of all of the active power saving classes overlap. During unavailable periods, the MSS 104 may power down the WNIC 116 to conserve power. The scheduler 152 of the base station 108 may either queue any transmissions for the MSS 104 during these periods and send them when the MSS 104 becomes available or simply discard the transmissions.

Figure 3:
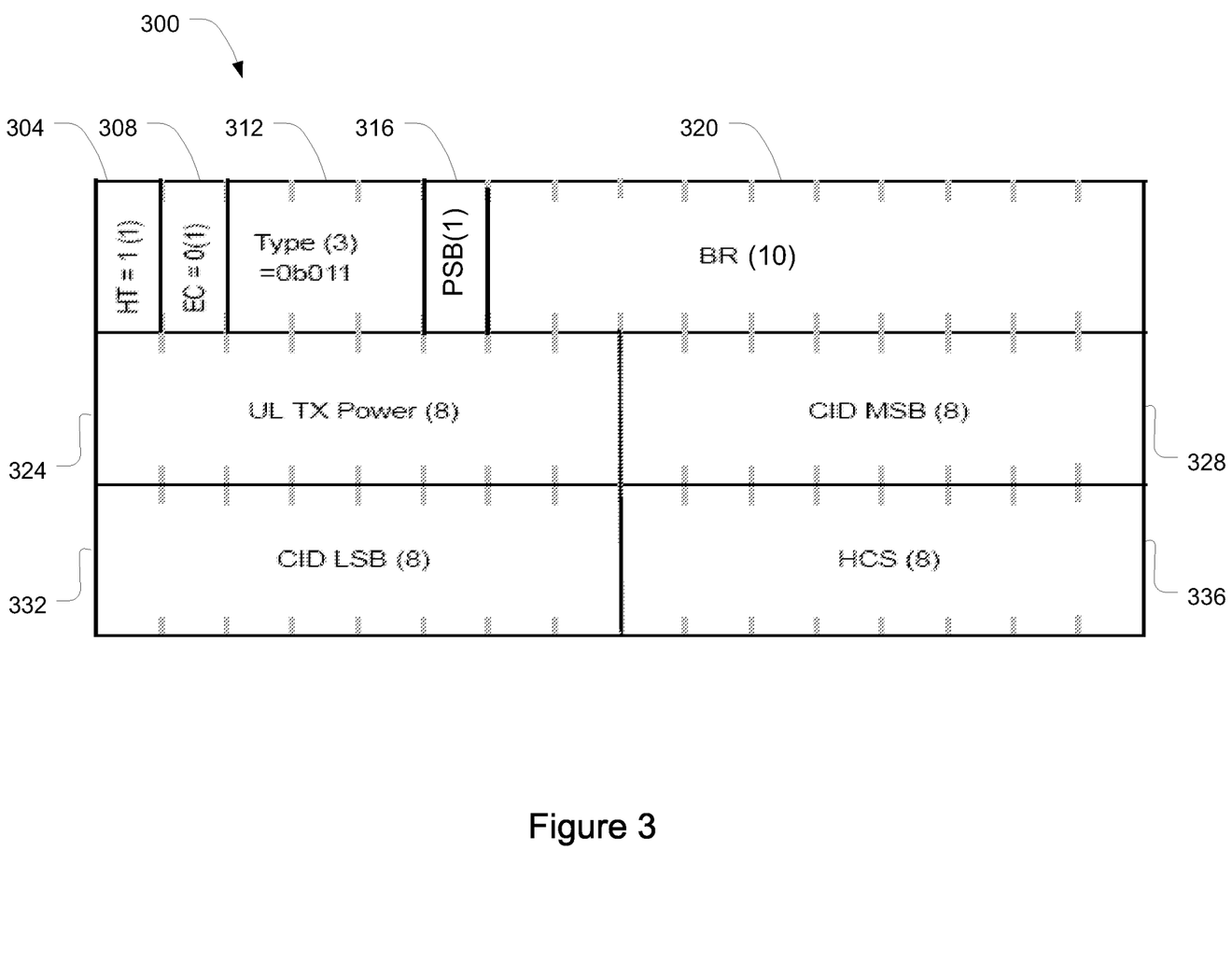
FIG. 3 illustrates a media access control frame header that may function as a power management message in accordance with an embodiment.

FIG. 3 illustrates a MAC frame header 300 that may function as a power management message in accordance with an embodiment. In particular, the MAC frame header 300 may be a bandwidth request (BR) and UL transmit (TX) power report header. In some embodiments, the MAC frame header 300 may not be followed by a MAC protocol data unit (PDU) payload or cyclic redundancy check (CRC) field.

The MAC frame header 300 may include a one-bit header type (HT) field 304, a one-bit encryption control (EC) field 308, a three-bit type field 312, a one-bit power saving bit (PSB) field 316, a ten-bit BR field 320, an eight-bit UL TX power field 324, an eight-bit connection ID (CID) most significant bit (MSB) field 328, an eight-bit CID least significant bit (LSB) field 332, and an eight-bit header check sequence (HCS) field 336.

The HT field 304 and EC field 308 may be management fields that convey information pertaining to the type of MAC frame header (e.g., whether it includes a PDU payload and CRC) and encryption. The type field 312 may, in conjunction with the HT field 304 and the EC field 308, convey additional information as to the specific type of header. For example, in this embodiment, the type field may include a code designating the MAC frame header 300 as a BR and UL TX power report header.

The PSB field 316 may include one or more bits that indicate whether an activation or a deactivation of a power saving class is desired. If the PSB field includes one bit, as shown, then having the bit set to one may correspond to an activation request while having it set to zero may correspond to a deactivation request. Other embodiments may include an opposite signaling scenario and/or additional bits.

The BR field 320 may be used to request an allocation of bandwidth, in the form of one or more UL access slots, for an upcoming data transmission. The BR may be a number of bytes of UL bandwidth requested by the MSS 104.

The UL TX power field 324 may be the power level, in decibels relative to one milliwatt (dBm), for the burst that carries the MAC frame header 300.

The CID fields, e.g., the CID MSB field 328 and the CID LSB field 332, may indicate the connection for which the uplink bandwidth is requested. The CID may also be used by the base station 108 to determine to which power saving class the activation/deactivation request pertains by reference to the associations in the stored contexts.

The HCS field 336 may be used to detect errors in the MAC frame header 300.

In other embodiments, power management information may be communicated through MAC frame headers other than the BR and UL TX power report header shown. For example, in other embodiments the MAC frame header may be a generic MAC frame header, a BR and carrier to interference and noise ratio (CINR) report header, etc.

Figure 4:
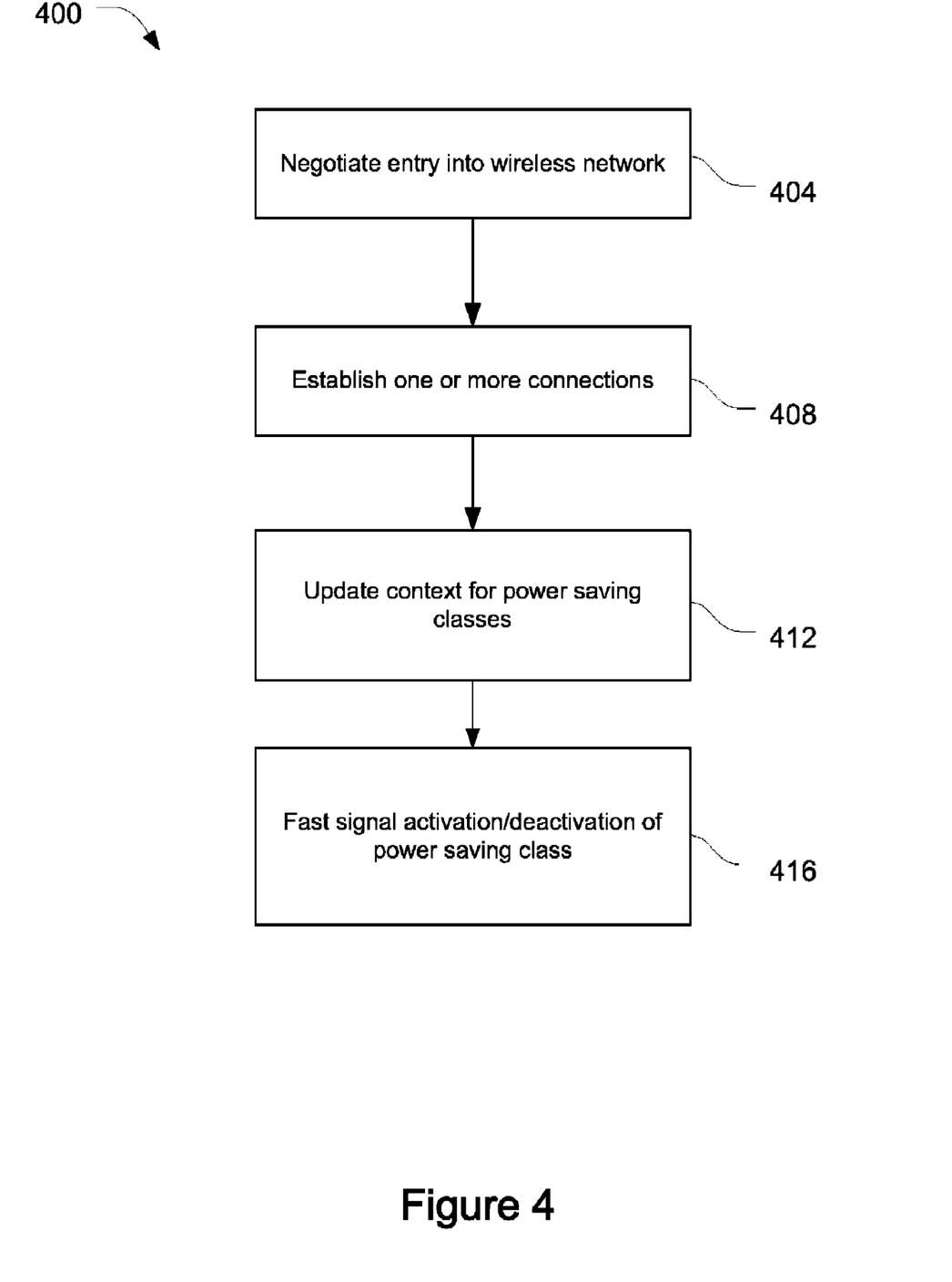
FIG. 4 is a flowchart depicting operation of a mobile subscriber station in accordance with various embodiments.

FIG. 4 is a flowchart depicting operation of the MSS 104 in accordance with various embodiments. At block 404, the MSS 104 may negotiate, with base station 108, entry into network 100. The network entry negotiation may include the power manager 132 providing, to the base station 108, a context for each of one or more power saving classes.

At, or after negotiation of network entry at block 404, the MSS 104 may establish one or more connections with the base station 108 to accommodate corresponding service flows at block 408. Along with, or after, the establishment of the one or more connections at block 408, the contexts of the power saving classes may be updated to reflect an association of the established connections with an appropriate power saving class.

In some embodiments, connections of a particular QoS type may have a default association to a particular power saving class. These default associations may then be overridden by updating the contexts of the power saving classes. For example, a connection having BE service may, as a default, be associated with a power saving class I. Consider, e.g., two BE connections being established between the MSS 104 and the base station 108. If the context of power saving class II is updated to reflect an association with the second BE connection, but not the first, the first BE connection may retain the default association with the power saving class I.

With the connections established and the contexts updated as desired at block 412, the power manager 132 may fast signal activation/deactivation of a power saving class at block 416. As described above, this may be done by transmitting power management information in a power management message such as a MAC frame header.

Figure 5:
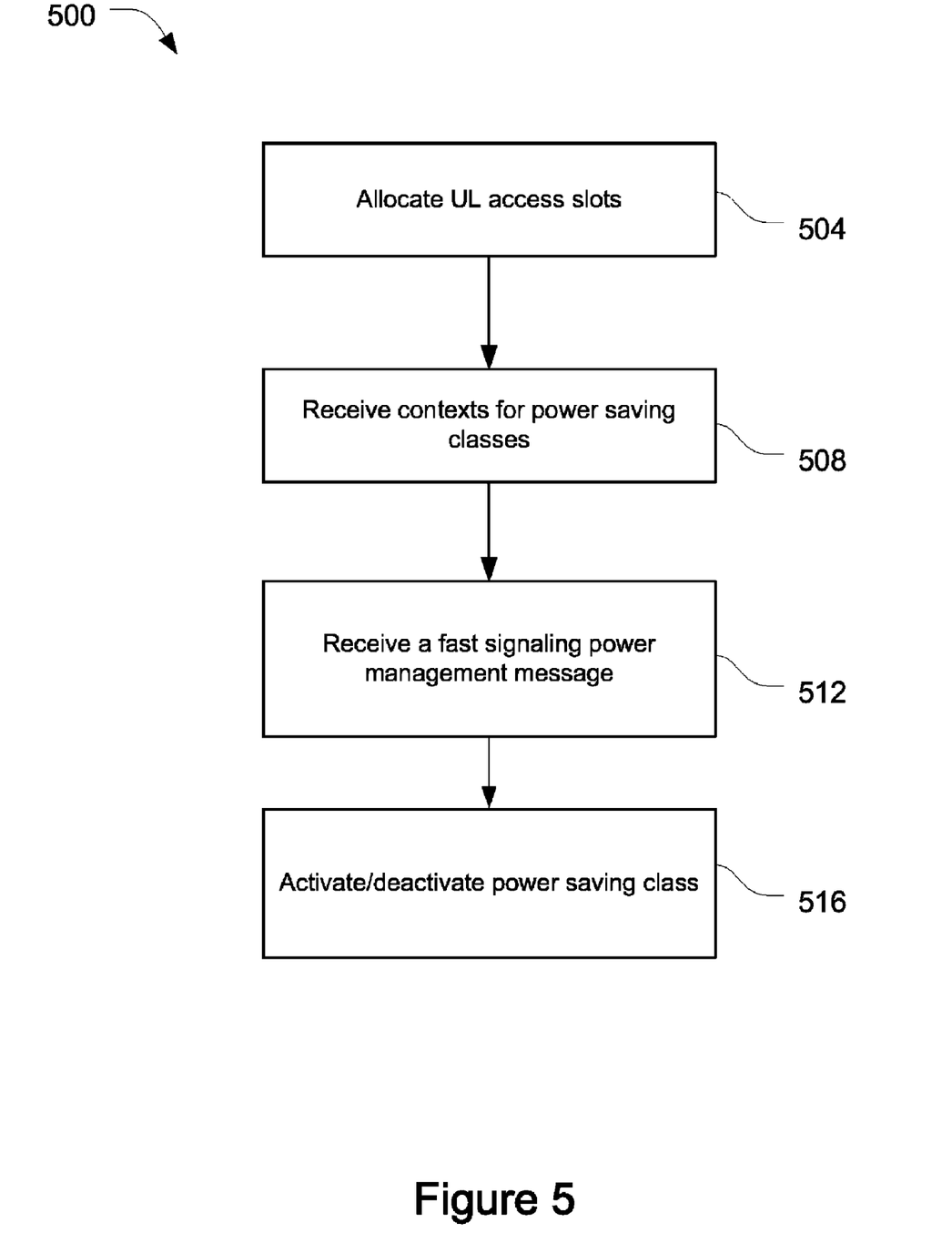
FIG. 5 is a flowchart depicting operation of a base station in accordance with various embodiments.

FIG. 5 is a flowchart 500 depicting operation of the base station 108 in accordance with various embodiments. At block 504, the scheduler 152 may allocate a number of UL access slots to the subscriber stations of the network 100, including MSS 104. This may be communicated through a UL map broadcast in a DL subframe.

At block 508, the scheduler 152 may receive a context for each of the power saving classes of the MSS 104. These contexts may describe associations between the power saving classes and established connections as well as other parameters of the power saving classes.

At block 512, the scheduler 152 may receive a fast signaling power management message from the MSS 104. The scheduler may reference the CID of the power management message and compare it to the associations in the stored contexts to determine to which power saving class the power management information pertains. At block 516, the scheduler 152 may activate/deactivate the appropriate power saving class. The scheduler 152 may schedule UL access slots and/or transmit information to the MSS 104 according to an aggregate of the activated power saving classes of the MSS 104 as described above.

Figure 6:
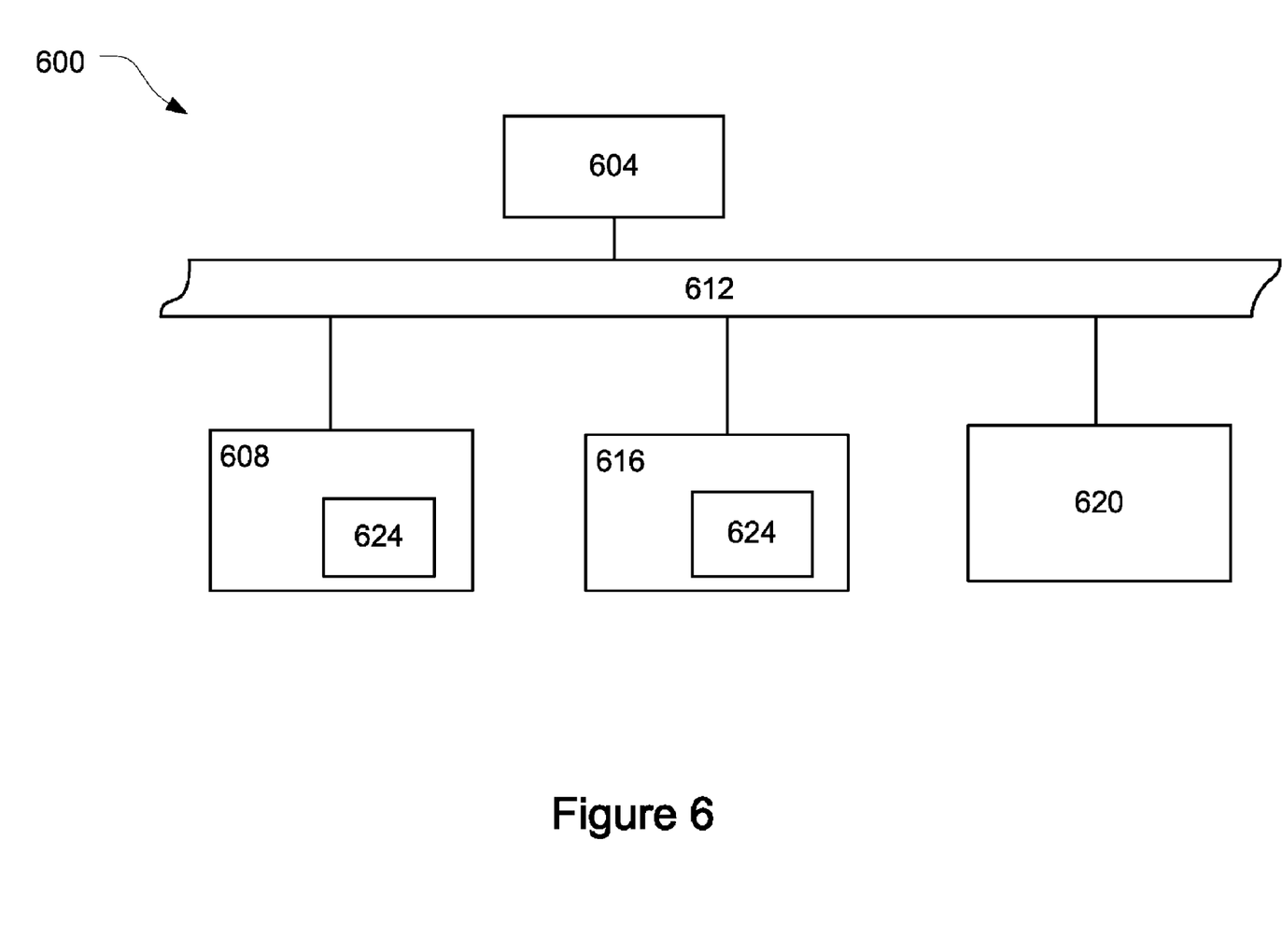
FIG. 6 illustrates a computing device capable of being installed in a host wireless network device in accordance with various embodiments.

FIG. 6 illustrates a computing device 600 capable of being installed in a host wireless network device in accordance with various embodiments. As illustrated, for the embodiments, computing device 600 includes processor 604, memory 608, and bus 612, coupled to each other as shown. Additionally, computing device 600 includes storage 616, and input/output interfaces 620 coupled to each other, and the earlier described elements as shown.

Memory 608 and storage 616 may include in particular, temporal and persistent copies of power management logic 624, respectively. The power management logic 624 may include instructions that when executed by the processor 604 result in the computing device 600 performing power management operations described in conjunction with various wireless network devices described herein.

In various embodiments, the processor 604 may include one or more single-core processors, multiple-core processors, controllers, application-specific integrated circuits (ASICs), etc.

In various embodiments, the memory 608 may include RAM, dynamic RAM (DRAM), static RAM (SRAM), synchronous DRAM (SDRAM), dual-data rate RAM (DDRRAM), etc.

In various embodiments, storage 616 may include integrated and/or peripheral storage devices, such as, but not limited to, disks and associated drives (e.g., magnetic, optical), universal serial bus (USB) storage devices and associated ports, flash memory, read-only memory (ROM), non-volatile semiconductor devices, etc.

In various embodiments, storage 616 may be a storage resource physically part of the wireless network device on which the computing device 600 is installed or it may be accessible by, but not necessarily a part of, the wireless network device. For example, the storage 616 may be accessed over a network.

In various embodiments, the input/output interfaces 620 may be configured to be coupled to a network interface, e.g., a WNIC, of a host wireless network device.

In various embodiments, computing device 600 may have more or less components, and/or different architectures. In various embodiments, computing device 600 may be installed in an MSS, a base station, or some other wireless network device.

Although the present invention has been described in terms of the above-illustrated embodiments, it will be appreciated by those of ordinary skill in the art that a wide variety of alternate and/or equivalent implementations calculated to achieve the same purposes may be substituted for the specific embodiments shown and described without departing from the scope of the present invention. Those with skill in the art will readily appreciate that the present invention may be implemented in a very wide variety of embodiments. This description is intended to be regarded as illustrative instead of restrictive on embodiments of the present invention.

What is claimed is:

1. A method comprising:
negotiating, with a base station, entry into a wireless network, including providing to the base station a context for each of one or more power saving classes;
establishing one or more connections with the base station;
updating, upon said establishing of the one or more connections, a context for a selected one or more power saving classes to associate at least a first connection of the one or more connections with the selected power saving class; and
transmitting a media access control (MAC) frame header having one or more power saving bits and a connection identifier, which identifies the first connection, to activate the selected power saving class.

2. The method of claim 1, further comprising:
powering down a network interface card based at least in part on the selected power saving class being activated.

3. The method of claim 1, further comprising:
transmitting a management message to update at least one context of the one or more contexts.

4. The method of claim 3, wherein transmitting the management message comprises transmitting a dynamic service addition message.

5. The method of claim 1, further comprising:
receiving, from the base station, an information element communicating power management capability of the base station.

6. The method of claim 1, wherein the MAC frame header is a bandwidth request and uplink transmit power report header.

7. The method of claim 1, wherein the MAC frame header is a generic MAC frame header.

8. The method of claim 1, wherein the MAC frame header is a bandwidth request and carrier to interference and noise ratio report header.

9. An apparatus comprising:
an input/output interface configured to be coupled to a network interface of a host device on which the apparatus is configured to be installed;
non-volatile storage having a scheduling component to allocate uplink access slots to one or more subscriber stations communicatively coupled to the host device; to receive, from a subscriber station of the one or more subscriber stations, via the network interface, a context for each power saving class of a plurality of power saving classes; to receive, from the subscriber station in an uplink access slot not specifically allocated for a power management message, a power management message having one or more power saving bits; and to activate a selected power saving class of the plurality of power saving classes for the subscriber station based at least in part on the one or more power saving bits of the power management message; and
a processor coupled to the input/output interface and the non-volatile storage to operate the scheduling component.

10. The apparatus of claim 9, wherein the received power management message is a media access control (MAC) frame header.

11. The apparatus of claim 10, wherein the MAC frame header is a bandwidth request and uplink transmit power report header or a bandwidth request and carrier to interference and noise ratio report header.

12. The apparatus of claim 9, wherein the received power management message includes one or more power saving bits and a connection identifier, which identifies a connection of one or more connections between the apparatus and the subscriber station, and the scheduling component is to activate the selected power saving class based at least in part on an association, in the context of the selected power saving class, between the selected power saving class and the connection.

13. The apparatus of claim 12, wherein the received power management message includes power management information consisting of the one or more power saving bits and the connection identifier.

14. An apparatus comprising:
a wireless network interface configured to communicatively couple the apparatus to a base station; and
a power management component coupled to the wireless network interface and configured
to provide, to the base station via the wireless network interface, a context for each of one or more power saving classes; and
to transmit, to the base station via the wireless network interface in an uplink access slot not specifically allocated for a power management message, a power management message having one or more power saving bits to activate a selected power saving class of the plurality of power saving classes for the apparatus.

15. The apparatus of claim 14, wherein one or more connections are established between the apparatus and the base station and the power management component is further configured to provide, in the context of the selected power saving class, an association between a first connection of the one or more connections and the selected power saving class.

16. The apparatus of claim 15, wherein the power management message further includes a connection identifier corresponding to the first connection.

17. The apparatus of claim 16, wherein the power management message includes power management information consisting of the one or more power saving bits and the connection identifier.

18. The apparatus of claim 14, wherein the power management message is a media access control (MAC) frame header.

19. The apparatus of claim 18, wherein the MAC frame header is a bandwidth request and uplink transmit power report header or a bandwidth request and carrier to interference and noise ratio report header.

20. The apparatus of claim 18, wherein the MAC frame header is a generic MAC frame header.

* * * * *